Patented July 16, 1940

2,208,216

UNITED STATES PATENT OFFICE 2,208,216

COATING COMPOUND

Arthur W. Johnson and George H. Young, Pittsburgh, Pa., assignors to Stoner-Mudge, Inc., a corporation of Pennsylvania No Drawing. Application July 28, 1938,
Serial No. 221,799

6 Claims. (Cl. 260—86)

In United States Letters Patent No. 2,130,924, we have described and claimed a thermally stabilized coating compound. The compound is defined as "consisting primarily of certain of those resinous polymeric vinyl compounds known commercially as Vinylite." The compound, it is explained, "are the polymers and co-polymers of various vinyl compounds, such polymers and co-polymers being of resinous nature;" and among them a typical list includes "polyvinyl acetate, polyvinyl propionate, polyvinyl chloride, polyvinyl bromide, polyvinyl chloro-bromide, polyvinyl chloro-acetate, polyvinyl chloro-propionate, and polyvinyl chloro-alcohol;" and the general characterization is "any polymer, co-polymer or polymeric mixture of the compound responding to the formula $CH_2=CH-X$, in which X may be a halogen, the hydroxyl group, acetoxyl, propionoxyl, or in general, any monocarboxylic acyloxyl group."

The substance that, added to Vinylite, affords improved thermal stability, is, according to the disclosure of the application named, "a pitch containing one or more of the tar bases which boil at temperatures higher than 240° C. at atmospheric pressure." These tar bases may be added, "either as isolated products, in the form of a purified pitchy wax containing the bases, or in the form of a crude pitch." Among specific substances successfully used, "coal tar pitch, natural asphalt, bone pitch, and water-gas pitch," and, additionally, technical quinoline are named.

In consequence of improved thermal stability, a protective film of the coating compound of the application "may be subjected to baking at increased temperatures, and as a result a marked improvement in cohesion to the surface being coated, and in resistance to moisture and other corrosive influences, is effected. Also as applied to a metal, the metal coated with a Vinylite film of increased thermal stability is capable, as a material or article, of being subjected to temperatures of increased severity without destruction of the coating thereon.

In United States Letters Patent No. 2,169,717, one of us has described and claimed a thermally stabilized coating compound, that consists of the same material, Vinylite, stabilized by the addition of other particular material. The stabilizer of this second application is described as "a compound selected from the class known as the quinoline and isoquinoline bases, and particularly from the cinchona alkaloid bases." The applicant says that he has used quinine with success, and also "isoquinine, hydroquinine, ethyl apoquinine, quinidine, cinchonine, cinchonidine, quinoidine, cinchona febrifuge, and crude apoquinine bases." "This," he says, "exhausts the list of readily available cinchona alkaloids." "I have found none," he adds, "that is not serviceable to achieve thermal stabilization, and my experimentation indicates that all of the cinchona alkaloids, pure and impure, single and mixed, are so serviceable."

The formula for quinoline, a typical substance of the first application, is

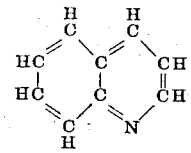

The formula for quinine is

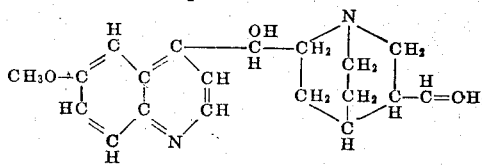

Our further investigations have revealed the fact that yet other substances will similarly serve as thermal stabilizers for Vinylite. We have found that the ring-substituted pyridines, for instance, will so serve. The formula for pyridine is

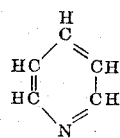

and the pyridine derivatives, or, in common parlance, "the pyridines" include compounds of $\alpha$, $\beta$, $\gamma$ or $\alpha\beta$, and $\alpha'\beta'$ type, according as one or more of the hydrogen atoms suffers displacement.

We have observed a common characteristic of all these stabilizing substances to be that all include nitrogen in ring formation, the double-bond of the nitrogen within the ring being conjugated with a double bond not within the ring. That is to say, with attention confined to the pyridines, all conform to a schematic formula, not intended to show valency considerations

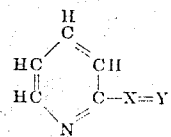

in which the component X=Y is a component of double-bond linkage, and this double-bond linkage is conjugate with the double-bond nitrogen within the ring.

In all of the instances given the following conjugation persists

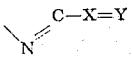

The pyridines include the α substituted, the αβ substituted, and the α'β' substituted pyridines (the last named being the benzo-pyridines, or quinolines). The formula for α styryl pyridine is

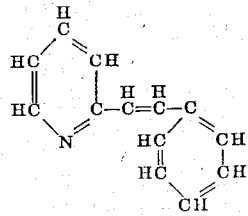

And in this formula the hydrogen atom of either the o', m', or p' positions or the hydrogen atoms of both o and o', the p, or the m and m' positions in the benzene ring may be replaced by the hydroxyl group, or by chlorine, bromine, or iodine. In addition, we have found the pyridyl ethylenes serviceable, among which α-pyridyl ethylene will serve as an example. Its formula is

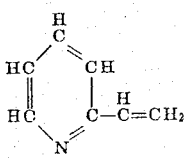

So iso-pyrophthalone will serve. Its formula is

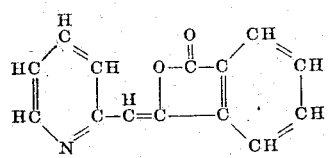

We have then found that substances generally of the class of heterocyclic nitrogen bases are serviceable, in which the ring includes a double-bonded nitrogen conjugated with a double bond not within the ring. In the schematic formula—

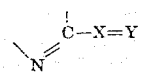

X may be any tri- or tetra-valent element capable of forming a double-bonded linkage (typically C or N) and Y may be typically C, N, or O; and, as has been seen the elements C or N, or C, N, or O, so situated, may, in turn, be linked in other groups of greatest diversity and variety.

We have found no substance so characterized that does not have in the association described the stabilizing effect indicated.

From these particular instances and generalizations we have advanced in the progress of our discovery to a yet wider field of generalization.

We have found that by adding, to the resinous polymeric vinyl compound specifically named above, a compound selected from the class consisting of the heterocyclic nitrogen bases containing side-chain substituents having at least one double bond which is conjugated with respect to a double-bonded nitrogen in the parent heterocyclic ring system, an applied coating of the mixture possesses greatly increased thermal stability. The ring-substituted nitrogen bases containing conjugated double-bond systems so added may be used either in the form of their pure compounds or as mixed concentrates, fractionated cuts, or basic residues derived from their synthetic preparation, or by extraction from heterocyclic nitrogen base-containing natural products.

Further, the double-bond system in the above mentioned side chain need not be a double bond between two carbon atoms; but may, for example, be the azo group, the carbonyl group, or the iso-cyanide group. In general, a type formula for the compounds contemplated is as follows:

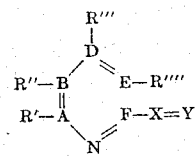

In the above formula N is nitrogen; X may be any tri- or tetra-valent element capable of entering into a double-bonded system, and typically may be carbon or nitrogen; Y may be any di-, tri-, or tetra-valent element capable of entering into a double-bonded system together with X, and typically may be carbon, nitrogen, or oxygen. R', R'', R''' and R'''' may be simply hydrogen, or any other aliphatic or aromatic hydrocarbon radical; similarly, R' and R'', and R''' and R'''' may be joined together by chemical bonds to form a condensed ring system; also R'''' and Y may be joined together to form a condensed ring system, except in the special case when Y is oxygen. Further, A, B, D, E, and F typically may be carbon atoms, or one or more may be another element, (such as nitrogen) capable of entering into a ring system and of bonding to side chains shown in the above generalized formula as R', R'', R''', and R''''. In a special case, oxygen or sulphur may be a member of the ring, in which case there will be no attached side group on that atom.

Specifically, we mean compounds of the pyridine, quinoline, and isoquinoline type, of the acridine type, of the pyrazine type, of the pyrazole type, of the thio pyrazole type, or (in general) heterocyclic bases containing at least one double-bonded ring nitrogen conjugated with a double bond outside the parent ring. Exemplary of compounds of pyrazine type are quinoxaline and quinazoline.

*Specific examples*

(1) To 100 grams of the resinous vinyl compound described above are added 2 grams of tripyridyl, and the whole brought into solution in a mixture consisting of 4 parts of methyl isobutyl ketone and 1 part of toluol, the total concentration of solids being typically 20 per cent by weight of the whole. This stabilized coating compound may be spread upon tin plate, for example, at the usual coating thicknesses and thereafter baked at temperatures approximating 350° F. without noticeable thermal decomposition.

(2) To 100 grams of the resinous vinyl compound described above, suitably dispersed in a solvent mixture consisting of 3 parts methyl ethyl ketone, 1 part of methyl isobutyl ketone, and 1 part of toluol, at a concentration of 20 per cent solids, is added 1 gram of isopyrophthalone. This stabilized coating compound may be spread upon iron, for example, and thereafter baked at temperatures approximating 330° F. without noticeable thermal decomposition.

(3) To 100 grams of the resinous vinyl compound described above, and dispersed in a suitable solvent mixture such as is described under Example 2, are added 2 grams of alpha pyridyl o-hydroxy phenyl ethylene. This stabilized coating compound may be spread upon tin-plate, for example, and thereafter baked at temperatures approximating 350° F. without noticeable thermal decomposition.

(4) To 100 grams of the resinous vinyl compound described above are added 2 grams of stilbazole, and the whole is then dispersed in a suitable solvent mixture such as is described under Example 1. This stabilized coating compound may be spread upon iron, for example, and thereafter baked at temperatures approximating 325° F. without noticeable thermal decomposition.

(5) To 100 grams of the resinous vinyl compound described above are added 2 grams of alpha pyridyl furyl ethylene, and the whole is then dispersed in a suitable solvent mixture such as is described under Example 2. This stabilized coating compound may be spread upon copper, for example, and thereafter baked at temperatures approximating 380° F. without noticeable thermal decomposition.

(6) To 100 grams of the resinous vinyl compound described above are added 2 grams of alpha pyridyl, o-chlorophenyl ethylene, and the whole is then dispersed in a suitable solvent mixture such as is described under Example 1. This stabilized coating compound may be spread upon zinc, for example, and thereafter baked at temperatures approximating 300° F. without noticeable thermal decomposition.

(7) To 100 grams of the resinous vinyl compound described above are added 2 grams of alpha benzopyridyl-p-chlorophenyl ethylene and the whole is then dispersed in a suitable solvent mixture such as is described under Example 1. This stabilized coating compound may be spread upon zinc, for example, and thereafter baked at temperatures approximating 300° F. without noticeable thermal decomposition.

(8) To 100 grams of the resinous vinyl compound described above are added 0.5 gram of quinicine, and the whole is then dispersed in a suitable solvent mixture such as is described under Example 2. This stabilized coating compound may be spread upon tin-plate, for example, and thereafter baked at temperatures approximating 360° F. without noticeable thermal decomposition.

(9) To 100 grams of the resinous vinyl compound described above are added 0.5 gram of cinchonicine, and the whole is then dispersed in a suitable solvent mixture such as is described under Example 2. This stabilized coating compound may be spread upon tin-plate, for example, and thereafter baked at temperatures approximating 360° F. without noticeable thermal decomposition.

(10) To 100 grams of the resinous vinyl compound described above may be added 2 grams of alpha benzopyridil o-p-dihydroxy phenyl ethylene, and the whole is then dispersed in a suitable solvent such as so described under Example 2. This stabilized coating compound may be spread upon iron, for example, and thereafter baked at temperatures approximating 325° F. without noticeable thermal decomposition.

(11) To 100 grams of the resinous vinyl compound described above may be added 2 grams of alpha pyrazol-o-hydroxy phenyl ethylene, and the whole is then dispersed in a suitable solvent such as is described under Example 2. This stabilized coating compound may be spread upon iron, for example, and thereafter baked at temperatures approximating 325° F. without noticeable thermal decomposition.

We claim as our invention:

1. A thermally stabilized coating compound consisting of a polymer of a substance responding to the formula $CH_2=CHX$, in which X is selected from a group consisting of the halogens, the hydroxyl group, and the monocarboxylic acyloxyl groups, and a thermal stabilizer consisting of a heterocyclic nitrogen base selected from the group consisting of $\alpha$-pyridyl-o-chlorophenyl ethylene, tripyridyl, isopyrophthalone, alpha pyridyl-o-hydroxy phenyl ethylene, stilbazole, alpha pyridyl furyl ethylene, alpha benzopyridyl-p-chlorophenyl ethylene, quinicine, cinchonocine, alpha benzo-pyridyl-o-p-dihydroxy phenyl ethylene, alpha pyrazol-o-hydroxy phenyl ethylene, and their basic derivatives and homologs, such stabilizer being present in a ratio not to exceed 5 parts by weight of stabilizer to 100 parts of the first named substance.

2. A thermally stabilized coating compound consisting of a polymer of a substance responding to the formula $CH_2=CH-X$, in which X is a substance of an association consisting of the halogens, the hydroxyl group, and the monocarboxylic acyloxyl groups, and a stabilizer consisting of isopyrophthalone.

3. A thermally stabilized coating compound consisting of a conjoint polymer of vinyl chloride and vinyl acetate, and a stabilizer consisting of a heterocyclic nitrogen base selected from the group consisting of $\alpha$-pyridyl-o-chlorophenyl ethylene, tripyridyl, isopyrophthalone, alpha pyridyl-o-hydroxy phenyl ethylene, stilbazole, alpha pyridyl furyl ethylene, alpha benzopyridyl-p-chlorophenyl ethylene, quinicine, cinchonocine, alpha benzopyridyl-o-p-dihydroxy phenyl ethylene, alpha pyrazyl-o-hydroxy phenyl ethylene, and their basic derivatives and homologs, such stabilizer being present in a ratio not to exceed 5 parts by weight of stabilizer to 100 parts of the first named substance.

4. A thermally stabilized coating compound consisting of a conjoint polymer of vinyl chloride and vinyl acetate, and a stabilizer consisting of isopyrophthalone.

5. A thermally stabilized coating compound consisting of a conjoint polymer of 85–87% vinyl chloride and 15–13% vinyl acetate, and a stabilizer consisting of isopyrophthalone, such stabilizer being present in a ratio not to exceed 5 parts by weight of stabilizer to 100 parts of the first named substance, the whole being dispersed in a mixture of solvents.

6. A thermally stabilized coating compound consisting of polyvinyl chloride, and a stabilizer consisting of isopyrophthalone.

ARTHUR W. JOHNSON.
GEORGE H. YOUNG.